United States Patent [19]
Kawabe et al.

[11] 3,778,260
[45] Dec. 11, 1973

[54] SUPERCONDUCTING MATERIALS

[75] Inventors: Ushio Kawabe; Mitsuhiro Kudo, both of Tokyo; Masato Ishibashi; Shigeo Fukase, both of Hachioji, all of Japan

[73] Assignee: Hitachi, Ltd., Tokyo, Japan

[22] Filed: Sept. 9, 1971

[21] Appl. No.: 178,925

[30] Foreign Application Priority Data
Sept. 9, 1970   Japan.............................. 45/78421

[52] U.S. Cl.................................... 75/174, 335/216
[51] Int. Cl............................................. C22c 27/00
[58] Field of Search....................... 252/518, 62.3 R, 252/134; 75/174; 335/216

[56] References Cited
UNITED STATES PATENTS
3,506,940   4/1970   Corenzwit et al................... 335/216
3,243,871   4/1966   Saur...................................... 29/599
2,822,268   2/1958   Hix ....................................... 75/174
2,881,069   4/1959   Rhodin ................................ 75/174

OTHER PUBLICATIONS
Z. Metallkde., Vol. 61, No. 2, 1970, pages 115–120.

*Primary Examiner*—Charles N. Lovell
*Attorney*—Craig, Antonelli and Hill

[57]   ABSTRACT

Intermetallic compound superconducting materials having a stable $\beta$-W type crystal structure represented by a general formula of $A_3B$ brought into their closest packed structure and having high critical temperatures in which a part of the atoms either in the A-sites or in the B-sites are replaced by the atoms of a tetra-, penta- or hexa-valent transition metal so that the ratio between the average atomic radius of the atoms in the A-sites and that of the atoms in the B-sites lies close to 1.

8 Claims, 7 Drawing Figures

FIG. 1

UNIT CELL OF $\beta$-W TYPE CRYSTAL STRUCTURE

CRITICAL TEMPERATURE OF $Nb_3Al_{1-y}Ta_y$

SUPERCONDUCTING MATERIALS

BACKGROUND OF THE INVENTION

1. Field of the Invention

The present invention relates to a superconducting material having a novel chemical composition, and more particularly to a superconducting material having a high critical temperature.

2. Description of the Prior Art

Superconducting materials have such interesting properties as perfect conductivity, diamagnetism, transition phenomenon, and the like. Various appliances utilizing these properties, such as superconducting magnets, magnetic shields, cryotrons, and the like have hitherto been developed.

Generally, in order to enable the material having a superconducting property to reveal its superconductivity it is necessary to cool the material to temperatures lower than its critical temperature. The critical temperature (Tc) of $Nb_3Sn$, which has been considered to be the superconducting material having the highest critical temperature is about 18°K. Consequently, in order to cool these superconducting materials to temperatures lower than their critical temperatures a high degree of cryogenic technique which utilizes expensive liquid helium as a refrigerant is necessary.

Thus, such various appliances utilizing the superconductivity as stated above are at present uneconomical from the point of view of operation hindering putting them into full practice. Under these circumstances the discovery has been greatly desired of superconducting materials having critical temperatures even a little higher than those of the known superconducting materials.

Since Kamerlingh Onnes discovered the superconductivity of mercury in 1911, a number of materials having superconducting property have been discovered. However, the critical temperatures of such materials are not so high. In 1959 a material having a relatively high critical temperature, $Nb_3Sn$ of a $\beta$-W type crystal structure having a critical temperature of 18°K, was discovered. During several years from the discovery of $Nb_3Sn$ various superconducting materials having critical temperatures close to that of $Nb_3Sn$ have been discovered. Examples of these materials are NbC (Tc = 12°K), NbN (Tc = 14°K), $V_3Si$ (Tc = 17°K) and $Nb_3Al$ (Tc = 18°K). These materials have the critical temperatures approximately equal to or lower than that of $Nb_3Sn$.

In 1968 Mattias et al. discovered $Nb_3Al_{0.8}Ge_{0.2}$ having a critical temperature of 20.05°K and $Nb_3Al_{0.75}Ge_{0.25}$ having a critical temperature of 20.50°K among Nb-Al-Ge series ternary intermetallic compounds having a $\beta$-W type crystal structure. However, since such intermetallic compound superconducting materials of the $\beta$-type crystal structure having high critical temperatures cannot be obtained until they are subjected to a long period of difficult ageing such as 700°C × 1,000 hours, the manufacture thereof is not easy.

SUMMARY OF THE INVENTION

An object of the present invention is to provide a superconducting material having a novel composition which can be made into the $\beta$-W type crystal structure having a high critical temperature even by a relatively short period of heat treatment in contrast to the very long period of heat treatment necessary for obtaining previous superconducting materials having high critical temperatures.

Another object of the present invention is to provide a superconducting material having a critical temperature higher than those of the known superconducting materials to enable the superconducting material to be used under more relaxed cryogenic conditions than previously.

The present invention is based on the discovery by the inventors that when the atoms either in the A-sites or B-sites of a superconducting material having the $\beta$-W type crystal structure represented by a general formula of $A_3B$ are substituted by the atoms of a transition metal having an atomic radius different from those of the atoms of the superconducting material so that the ratio between the average radius of the atoms in the A-sites and the average radius of the atoms in the B-sites approaches 1, the $\beta$-W type crystal approaches the closest packed structure thereby facilitating the formation of the stable $\beta$-phase and providing a superconducting material having a high critical temperature.

More particulary, the superconducting material according to the present invention is such that in a superconducting material of the $\beta$-W type crystal structure represented by a general formula of $A_3B$ the A-sites of which are occupied by the atoms of a transition metal selected from the group consisting of Ti, V, Cr, Nb, Mo and Ta and the B-sites of which are occupied by the atoms of an element selected from the group consisting of Si, Ge, Sn, Pb, Al, Ga, In, Hg, Au, Pt, Ir, Os, Ag, Pd and Rb a part of the atoms occupying at least either the A-sites or the B-sites are substituted by the atoms of at least one element selected from the above transition metal group and different from the element in the A-site so that the relation $$\left|1 - R_A/R_B\right| - \left|1 - R_{A'}/R_{B'}\right| > 0$$

is satisfied where $R_A$ is the average radius of the atoms in the A-sites before the substitution, $R_B$ is the average radius of the atoms in the B-sites before the substitution, $R_{A'}$ is the average radius of the atoms in the A-sites after the substitution, and $R_{B'}$ is the average radius of the atoms in the B-sites after the substitution.

The superconducting material according to the present invention is best when a part of the Nb or Al atoms of the superconducting material the A-sites of which are occupied by Nb atoms and the B-sites of which are occupied by Al atoms or Al and Ge atoms is substituted by Ta atoms.

Compared with $Nb_3Al_{1-y}Ge_y$ ($y$ = 0.2 and 0.25) known as having the highest critical temperatures in the past the superconducting materials according to the present invention have the following advantages:

1. It is easy to crystallize the material in the desired $\beta$-W type crystal structure and the ageing is also easy.
2. The critical temperatures are approximately equal to or higher than the known highest critical temperature.
3. The critical current density Jc is high and hence the current transport ability is high.
4. The critical magnetic field Hr is also high.

DESCRIPTION OF THE PREFERRED EMBODIMENTS

Figure 1:
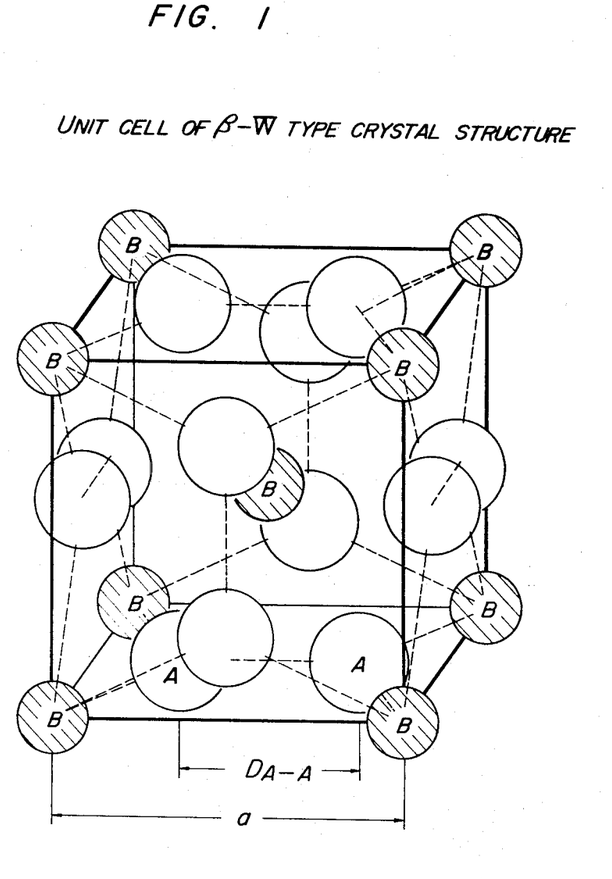
FIG. 1 is a schematic diagram of a model of the $\beta$-W type crystal structure represented by the formula $A_3B$.

A model (unit cell) of the crystal structure of the intermetallic compound superconducting material having the $\beta$-W type crystal structure and represented by a general formula of $A_3B$ is as shown in FIG. 1. Generally, the A-sites are occupied by the atoms of a tetra-, penta- or hexa-valent transition metal such as Ti, V, Cr, Zr, Nb, Mo or Ta, and the B-sites are occupied by the atoms of a non-transition metal such as Al, Ga, In or Hg, a semi-metallic element such as Si, Ge, Sn or Pb, or a platinum group element such as Au, Pt, Ir, Os, Ag, Pd or Rb. However, as has been stated above, only a few superconducting materials among the known $\beta$-W type superconducting materials consisting of the combination of the above enumerated elements have critical temperatures higher than 15°K.

The superconducting materials according to the present invention having high critical temperatures are provided by substituting a part of the Nb or Al atoms of intermetallic compound superconducting materials having the $\beta$-W type crystal structure and represented by the formula $Nb_3Al_{1-y}Ge_y$ ($0 \leq y \leq 1$) by the atoms of another metal, in particular Ta atoms.

Some of these superconducting materials according to the present invention are provided by substituting a part of the atoms (Nb) in the A-sites of the composition represented by $Nb_3Al_{1-y}Ge_y$ by the atoms of a transition metal (for example Ta) having an atomic radius slightly different from that of Nb so that the average number of valence electrons (electrons of the outermost shell) per atom is from 4.5 to 4.6 and further by somewhat increasing the number of Al atoms having a larger atomic radius between the atoms in the B-sites (Al and Ge). By doing so the superconducting materials of the $\beta$-W type crystal structure approach the closest packed state.

Some other of the superconducting materials according to the present invention are provided by increasing the concentration of Al between the atoms in the B-sites of the composition $Nb_3Al_{1-y}Ge_y$ and by substituting a part of the Al atoms by the atoms of a tetra-, penta- or hexa-valent transition metal (for example Ta) to bring the $\beta$-W type crystal structure close to the closest packed state.

The superconducting materials according to the present invention having the above-stated chemical composition relatively easily crystallize in the stable $\beta$-W type crystal structure and have critical temperatures higher than 19°K, and some of them even have critical temperatures as high as 21°K.

Example 1

As starting materials, four bulks of materials, Nb, Ta, Al and Ge each having a purity of 99 percent up were prepared, and weighed quantities of them for various values of $x$ and $y$ of the chemical formula $(Nb_{1-x}Ta_x)_3Al_{1-y}Ge_y$ were melted in a plasma arc furnace in an argon atmosphere for mixing together. The thus prepared quarternary alloy were again melted in a levitation melting furnace and were cast cast in a mold having a diameter of about 2 to 3 mm and a length of about 30 mm to be formed into a rod ingot. The rod ingot as cast was placed in a quartz tube, and, after sealed in a vacuum, subjected to a heat treatment (ageing treatment) at a temperature of from 650° to 1,100°C for 24 to 360 hours.

The values of $x$ and $y$ of the resulting intermetallic compounds were quantitatively determined by a chemical analysis, and the crystal structures and lattice constants thereof were examined by an X-ray powder diffraction method.

As a result of the above investigation it has been confirmed that the materials having the composition $(Nb_{1-x}Ta_x)_3Al_{1-y}Ge_y$ in which the values of $x$ and $y$ are selected to be within ranges of $0.01 \leq x \leq 0.50$ and $0.02 \leq y \leq 0.30$, respectively, result in a favorable $\beta$-W type crystal structure by the above-mentioned heat treatment.

According to the result of an X-ray diffraction testing, some of the materials as cast already showed X-ray diffraction patterns of the $\beta$-W type crystal structure. However, they were generally broad patterns. As the heat treatment proceeded, the patterns became sharper.

In the superconducting materials according to the present invention provided in the above-described manner the interatomic distance ($D_{A-A}$ in FIG. 1) between the Nb atoms in the A-sites is made slightly smaller by the replacement of a part of the Nb atoms by the Ta atoms having atomic radii smaller than those of the Nb atoms, while the interatomic distance ($a$ in FIG. 1) between the atoms in the B-sites is made larger by the increase in the concentration of Al atoms having atomic radii larger than those of Ge atoms with the result that the interatomic distance $D_{A-A}$ between the Nb atoms in the A-sites is increased in spite of the replacement by the Ta atoms. On the other hand, the average radius of the atoms in the A-sites becomes smaller by the replacement by the Ta atoms, and the average radius of the atoms in the B-sites becomes larger by the increase in the concentration of the Al atoms. Thus, the ratio between the two average atomic radii approaches 1. Accompanying these changes the $\beta$-W type structure crystals having the above-described compositions approach the closest packed state to relatively easily settle in the stable $\beta$-phase.

Incidentally, the lattice constant $a$ of the superconducting material obtained by melting the alloy having the composition $(Nb_{0.95}Ta_{0.05})_3Al_{0.85}Ge_{0.15}$ in the above-described manner and further by subjecting to a heat treatment of 720°C × 360 hours was $a = 5.183$ angstroms which is slightly larger than the $a = 5.174$ angstroms of $Nb_3Al_{0.8}Ge_{0.2}$.

Figure 2:
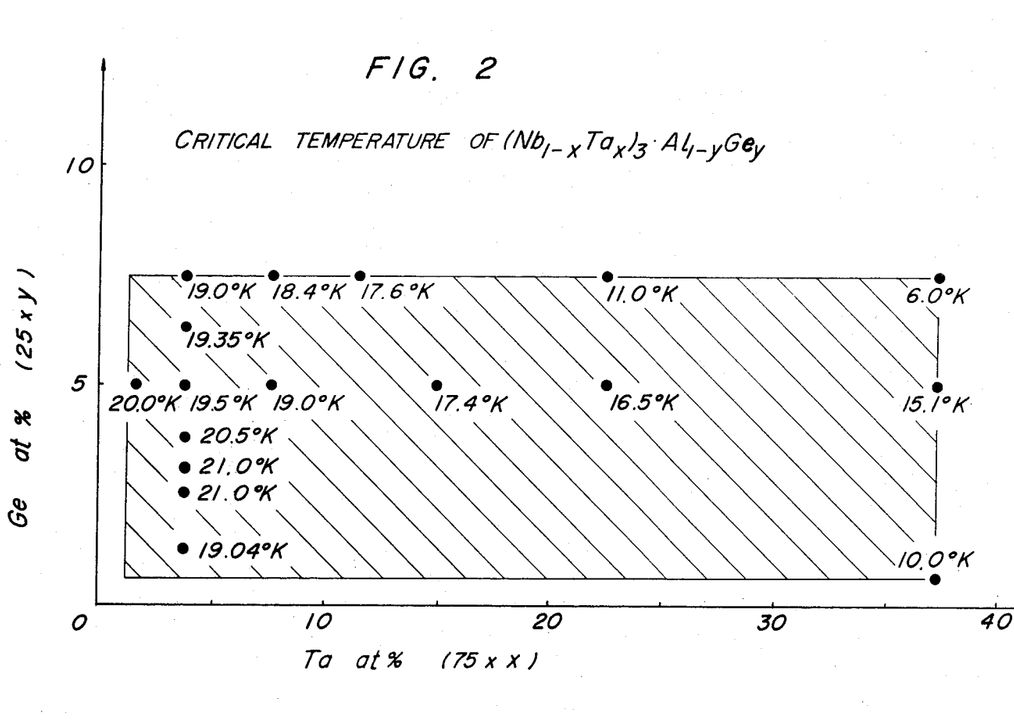
FIG. 2 is a diagram showing the relation between the compositions of $(Nb_{1-x}Ta_x)_3Al_{1-y}Ge_y$ series intermetallic compound superconducting materials and the critical temperatures thereof.

FIG. 2 shows the relation between the concentration $x$ of Ta atoms, the concentration $y$ of Ge atoms, and the critical temperature of the intermetallic compound superconducting materials prepared by subjecting the alloys as cast in the above-described manner to an ageing treatment of 720°C × 360 hours. The critical temperature was measured by an ordinary four-point resistivity method when a current of a current density of 1 A/cm$^2$ was allowed to flow through a specimen 30 mm long. The critical temperature was determined to be such a temperature at which the resistivity of the specimen became one-half the difference between the resistivities in the super and normal conducting states during the transition between the super and normal conducting states.

From these investigations it has been found that in this example superconducting materials having relatively high critical temperatures are provided when the value of $x$ is within a range of 0.01 to 0.50 and the value of $y$ is within a range of 0.02 to 0.30, that is, when Nb is at 74.0 to 37.5 atomic percent, Ta is at 1.0 to 37.5 atomic percent, Al is at 24.5 to 17.5 atomic percent, and Ge is at 0.5 to 7.5 atomic percent as shown in FIG. 2. In particular, among these superconducting materials those having a value of $x$ of 0.05 and a value of $y$ of 0.10 to 0.16, that is, Nb at 71.25 atomic percent, Ta at 3.75 atomic percent, Al at 22.5 to 21.0 atomic percent, and Ge at 2.5 to 4.0 atomic percent have a critical temperature of 21°K. Such materials enable their appliances to be markedly inexpensive because such materials reveal their superconductive property even in a cryogenic system employing liquid hydrogen instead of liquid helium.

Figure 3:
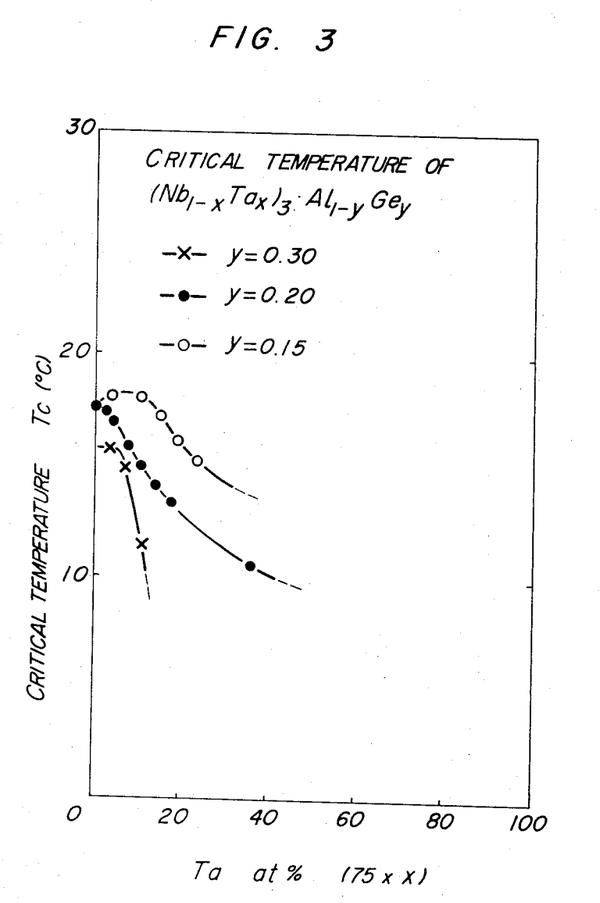
FIGS. 3 and 4 are graphs showing the relations between the concentration of Ta and the critical temperature of the superconducting materials embodying the present invention.

FIG. 3 shows the relation between the value of $x$, that is, the concentration of Ta atoms and the critical temperature of the superconductive materials as cast of Example 1 when the concentration of Ge atoms, that is, the value of $y$ is set at 0.30, 0.20, and 0.15. In the case of the materials as cast in which the concentration of Ge atoms is 7.5 atomic percent, that is, the value of $y$ is 0.3, the critical temperature lowers rapidly with the amount of replacement of the Nb atoms in the A-sites by the Ta atoms, i.e., with the increase in the value of $x$. Also when the value of $y$ is 0.20, the critical temperature decreases monotonically though more gradually than when the value of $y$ is 0.30. However, in the case of $y$ = 0.15, a peak of th critical temperature occurs between concentrations of 3 and 12 atomic percent of the Ta atoms.

Figure 4:
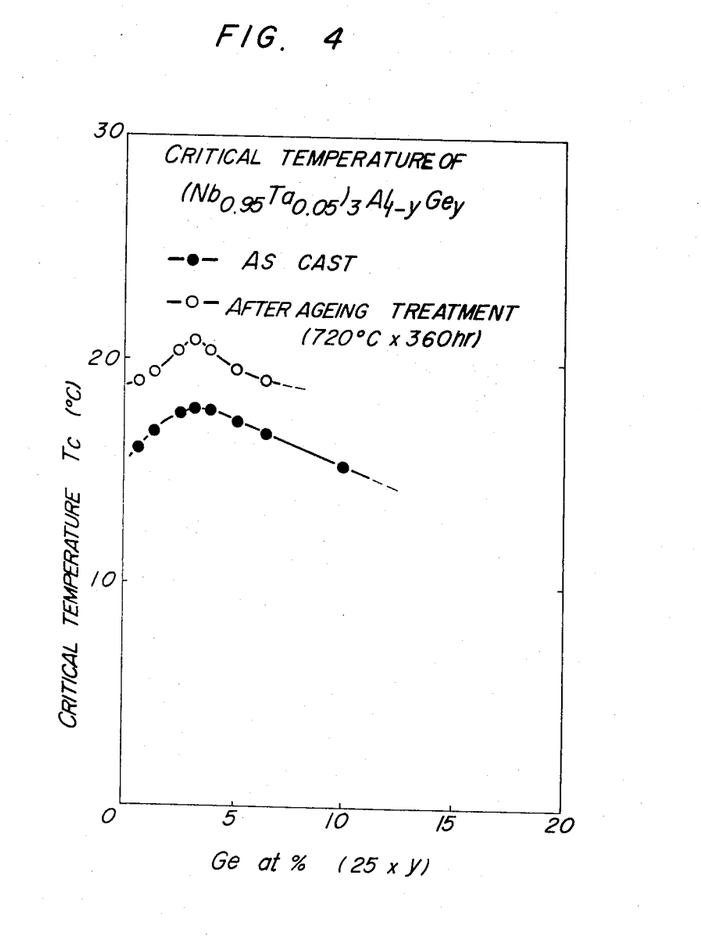

FIG. 4 shows the relation between the value of $y$ and the critical temperature of the materials as cast and the materials subjected to a heat or ageing treatment of 720°C × 360 hours after being cast when the value of $x$ is set at 0.05. These relations for the materials as cast and for the materials subjected to an ageing treatment are substantially parallel to each other, the critical temperatures of the materials subjected to the ageing treatment being higher by about 2° to 3°C than those of the materials as cast. Peaks of the critical temperatures occur between concentrations of 2.5 and 4.0 atomic percent of Ge atoms.

Figure 5:
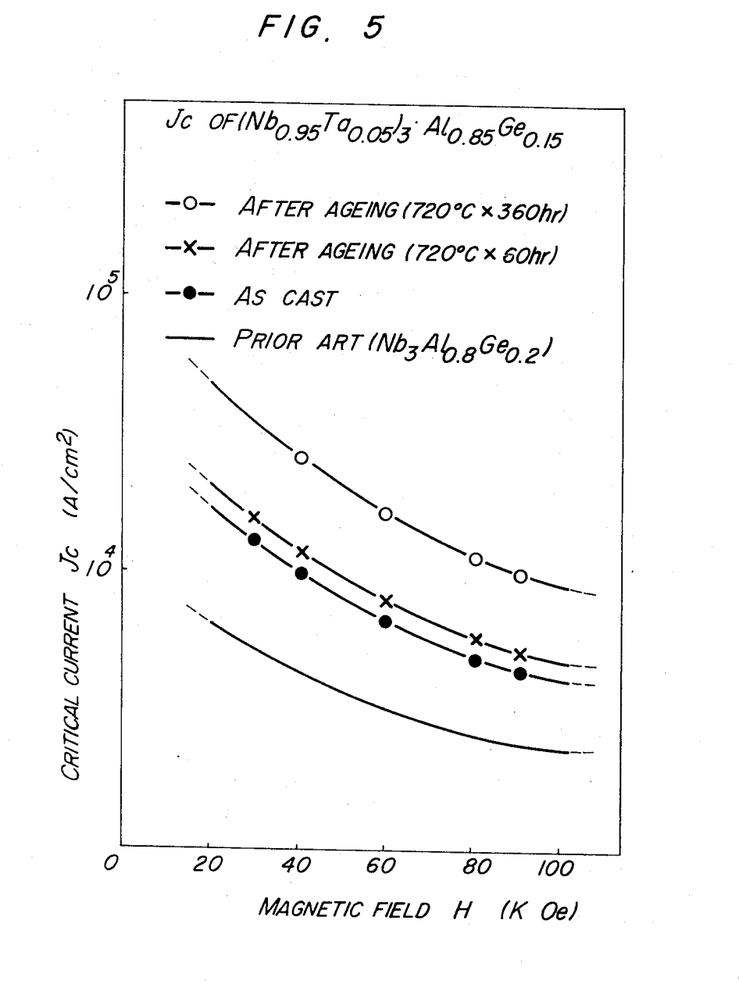
FIG. 5 is a graph showing the relation between the critical current Jc and the transversely applied magnetic field in the superconducting materials according to the present invention.

FIG. 5 shows the critical current (Jc) versus transverse magnetic field (H) characteristics of the superconducting material $(Nb_{0.95}Ta_{0.05})_3 \cdot Al_{0.85}Ge_{0.15}$ which has a high critical temperature among the superconducting materials according to the present invention in three phases, as cast, subjected to a heat treatment of 720°C × 60 hours, and subjected to a heat treatment of 720°C × 360 hours.

The critical current Jc was defined as follows. An electric current is allowed to flow across both ends of a specimen shaped into a length of 30 mm and cooled to a temperature of 4.2°K. In this state a magnetic field is applied to the specimen perpendicularly to the current, that is, the magnetic field is applied such that the current and the magnetic field are orthogonal H ⊥ Jc. Then the electric current is increased until a voltage is detected across both ends of the specimen. The critical current Jc is defined as the current density at the moment the voltage begins to appear across the both ends of the specimen.

As seen from FIG. 5, the superconducting material $(Nb_{0.95}Ta_{0.05})_3 \cdot Al_{0.85}Ge_{0.15}$ subjected to the ageing treatment of 720°C × 360 hours has a current transport ability of $1.2 \times 10^4$ A/cm$^2$ at 4.2°K even in a transverse magnetic field of 80 KOe. This value of the critical current is a fairly high value compared with that of $Nb_3Al_{0.8}Ge_{0.2}$ which is known as the material having the highest critical temperature in the past. Also, the resistive magnetic critical field Hr inferrable from the H-Jc characteristics in FIG. 5 is considered to amply exceed 100 KGauss and to reach 400 KGauss.

Example 2

Three bulks of materials, Nb, Al and Ta each having a purity of 99 percent up were prepared and mixed in various ratios so that the value of $y$ of the composition represented by a general formula $Nb_3Al_{1-y}Ta_y$ took various values. The mixtures were melted in an argon atmosphere in a plasma flame furance to be alloyed similarly to the processes in Example 1. The molten alloys were once cooled, again melted in a levitation melting furnace, and cast into a rod shape having a diameter of 2 to 3 mm and a length of 30 mm. The thus obtained cast material was placed in a quartz tube and sealed in a vacuum, and then subjected to a heat or ageing treatment of 720°C × 360 hours. The resulted samples were examined in their compositions by chemical analysis and in their crystal structures by X-ray powder diffraction testing.

Among the materials obtained by the above-described processes the materials formed into intermetallic compounds having a β-W type crystal structure after the ageing treatment were those having the compositions in a range of $0.04 \leq y \leq 0.48$. In particular, those having the compositions in a range of $0.04 \leq y \leq 0.24$ showed already in the cast state a considerable degree of the β-W type crystal structure.

In this example, the Ta atoms occupy the B-sites and increase the interatomic distance between the atoms in the B-sites compared with the interatomic distance between the Al atoms, the dominant atoms in the B-sites, and further increase the interatomic distance between the Nb atoms in the A-sites. The average atomic radius of the atoms in the B-sites increases with the increase in the concentration of the Ta atoms and approaches the atomic radius of the Nb atom in the A-site, that is, the ratio between the average atomic radii of the atoms in A- and B-sites approaches 1 to result in a stable β-W type crystal structure in a nearly closest packed state.

The optimum amount of the Ta atoms is considered to be approximately $y = 0.1$. The lattice constant $a$ of the crystal in the β-phase at the time of $y = 0.1$ was $a$ = 5.197 angstroms.

Figure 6:
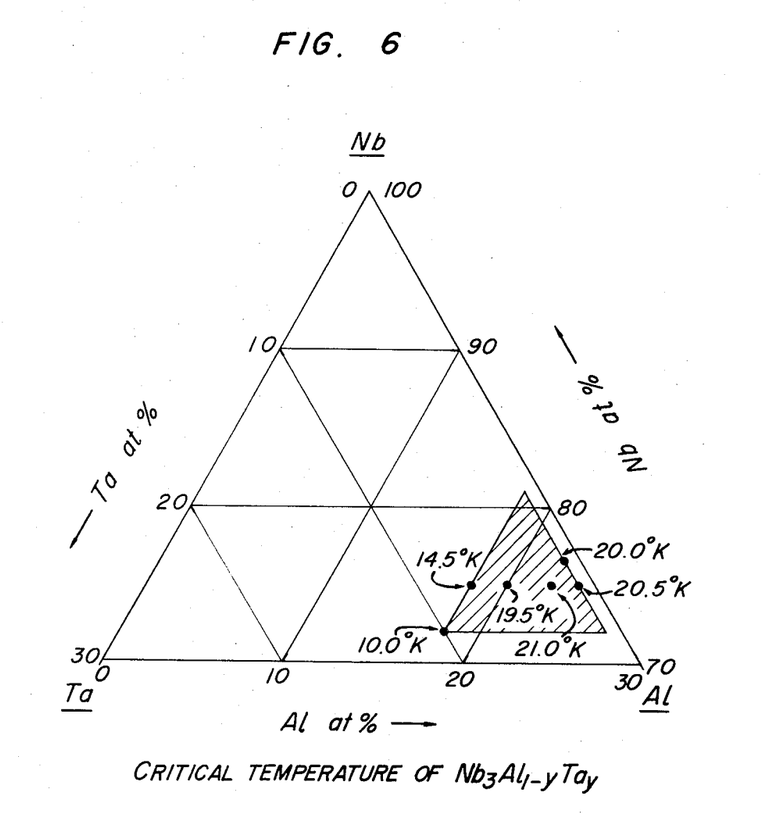
FIG. 6 is a diagram showing the relation between the compositions of $Nb_3Al_{1-y}Ta_y$ series intermetallic compound superconducting materials and the critical temperatures thereof.

FIG. 6 shows the relation between the composition of the intermetallic compound superconducting material having the $\beta$-W type crystal structure represented by $Nb_3Al_{1-y}Ta_y$ prepared by the processes of Example 2 and the critical temperature Tc thereof. It is apparent from FIG. 6 that in Example 2, superconducting materials having high critical temperatures can be provided when the compositions thereof are within ranges of Nb: 72 to 81 atomic percent, Al: 18 to 27 atomic percent, and Ta: 10 to 1 atomic percent. In particular, the material having the composition Nb: 75.0 atomic percent, Al: 22.5 atomic percent, and Ta: 2.5 atomic percent, i.e. $y = 0.1$, has a critical temperature Tc of Tc = 21°K when subjected to an ageing treatment.

Figure 7:
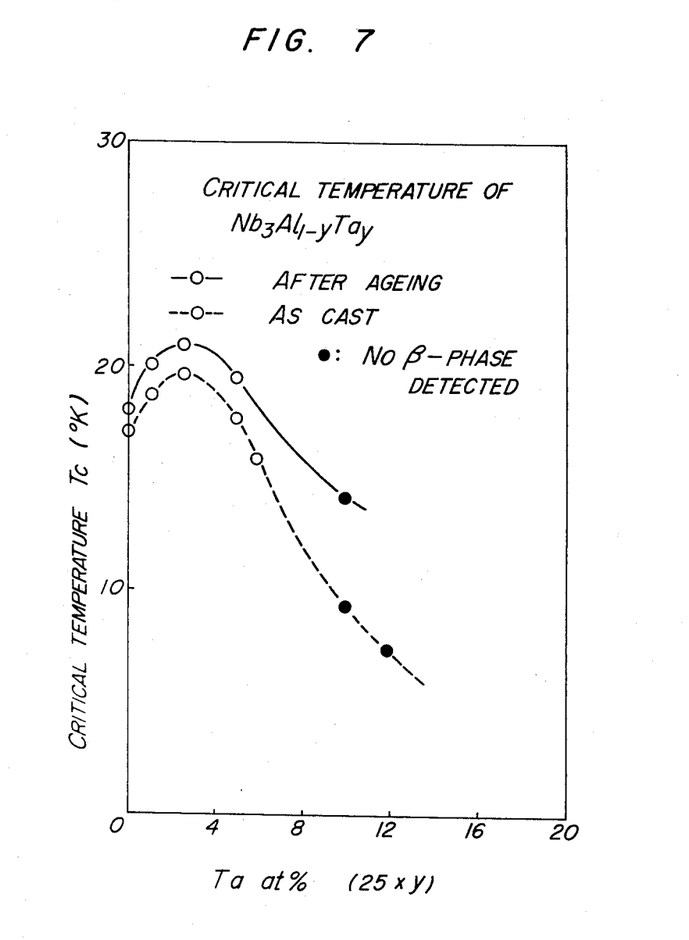
FIG. 7 is a graph showing the relation between the critical temperatures and the concentration of Ta atoms of the embodiment of FIG. 6.

FIG. 7 shows the relations between the compositions and the critical temperatures of the superconducting materials of Example 2 represented by $Nb_3Al_{1-y}Ta_y$ as cast and subjected to the heat treatment. In both kinds of materials there are peaks of the critical temperatures at a concentration between 2 to 4 percent in terms of the Ta atoms. The maximum value of the critical temperature of the materials subjected to the heat treatment is about 21°K. At the concentrations of the Ta atoms exceeding 10 atomic percent the crystallization into a $\beta$-W type crystal structure is difficult, in particular, any crystal of the $\beta$-W type crystal structure of the materials as cast is not recognized and the critical temperature thereof lowers rapidly.

As embodiments of the present invention the $(Nb_{1-x}Ta_x)_3Al_{1-y}Ge_y$ series $\beta$-W crystal type intermetallic compound superconducting materials and the $Nb_3Al_{1-y}Ta_y$ series $\beta$-W crystal type intermetallic compound superconducting materials have been described in detail. In addition thereto, also the isomorphous intermetallic compound superconducting materials can be formed into superconducting materials having a $\beta$-phase and high critical temperatures by substituting a part of the atoms in the A- or B-sites by the atoms of a transition metal having an atomic radius different from that of the atoms to be replaced so that the ratio between the average atomic radii of the atoms in the A- and B-sites approaches 1 to put the $\beta$-W type crystal structure in a state close to the closest packed state.

We claim:

1. A superconducting material having a high critical temperature, said material being an intermetallic compound represented by a formula $(Nb_{1-x}Ta_x)_3Al_{1-y}Ge_y$, wherein the values of $x$ and $y$ are $0.01 \leq x \leq 0.50$ and $0.02 \leq y \leq 0.30$, respectively.

2. A superconducting material according to claim 1, wherein the value of $x$ is 0.05 and the value of $y$ is from 0.10 to 0.16.

3. A superconducting material according to claim 1, having the formula $(Nb_{0.95}Ta_{0.05})_3Al_{0.85}Ge_{0.15}$.

4. A superconducting material according to claim 1, having a critical temperature of 21°K.

5. A superconducting material having a high critical temperature, said material being an intermetallic compound represented by a formula $Nb_3Al_{1-y}Ta_y$, wherein the value of $y$ is $0.04 \leq y \leq 0.48$.

6. A superconducting material according to claim 5, wherein the value of $y$ is $0.04 \leq y \leq 0.24$.

7. A superconducting material according to claim 6, wherein the value of $y$ is 0.1.

8. A superconducting material according to claim 5, having a critical temperature of 21°K.

* * * * *